United States Patent [19]

Aitken et al.

[11] Patent Number: 5,024,469

[45] Date of Patent: Jun. 18, 1991

[54] ADJUSTABLE LENGTH PIPING UNION

[76] Inventors: W. Sidney Aitken; Ralph Gonzales, both of 2820 N. San Fernando Blvd., Burbank, Calif. 91504

[21] Appl. No.: 484,075

[22] Filed: Feb. 23, 1990

[51] Int. Cl.⁵ .............................................. F16L 27/12
[52] U.S. Cl. .................................. 285/302; 285/339; 285/351; 285/354
[58] Field of Search ............... 285/351, 354, 302, 344, 285/345, 906, 339, 347, 113; 403/109, 104, 377; 411/352, 353

[56] References Cited

U.S. PATENT DOCUMENTS

| 2,346,051 | 4/1944 | Seamark | 285/339 |
| 2,738,992 | 3/1956 | Heisler | 285/344 X |
| 3,494,639 | 2/1970 | Smith | 285/113 |

FOREIGN PATENT DOCUMENTS

| 29877 | 9/1907 | Austria | 285/344 |
| 859816 | 1/1961 | United Kingdom | 285/344 |

Primary Examiner—Randolph A. Reese
Assistant Examiner—Heather Chun
Attorney, Agent, or Firm—Donald D. Mon

[57] ABSTRACT

An adjustable length piping union having telescoping tubes. An inner tube has outer ring grooves whose bottom walls slope, and whose axial width is greater than the width of an O-ring contained in them. This enables an easier reduction in length than increase in length. A ledge permits passage of the rings for assembly, but frustrates the separation of the tubes.

5 Claims, 1 Drawing Sheet

U.S. Patent
June 18, 1991
5,024,469
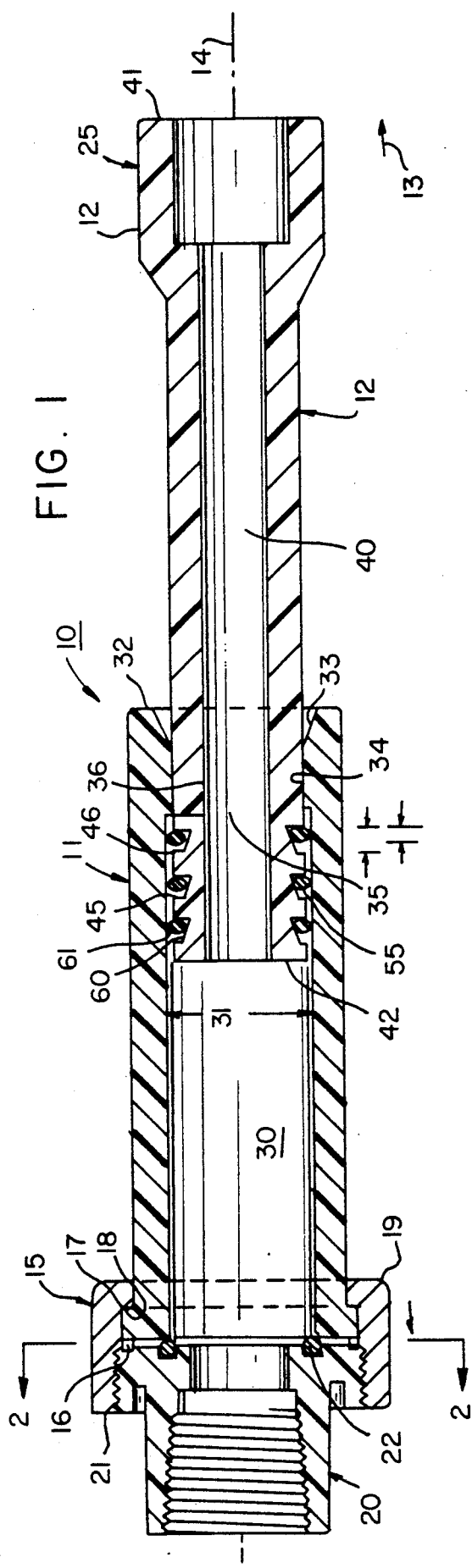

ADJUSTABLE LENGTH PIPING UNION

FIELD OF THE INVENTION

A piping union having the property of adjustable length to accommodate for changes in length needed to enable installation in existing installations, and for compensation in installations wherein the precise length is not yet known.

BACKGROUND OF THE INVENTION

Many piping systems require periodic or emergency repairs and maintenance of in-line devices. Examples of such in-line devices are valves, filters, flow controls, and sensors. These are merely exemplary of many other types of piping system components. Usually these are fixed to some substrate structure, or perhaps are partly or entirely encased or buried. In order to connect to these components, a union must be provided whose length can be reduced for access purposes, and enlarged for connection purposes. Such unions are useful both for procedures conducted after installation, and also for procedures conducted as part of an original installation.

Unions for these purposes are well-known. They often are referred to as "slip" or "telescopic" joints. They share the required function of enabling a pair of tubes to telescope relative to one another with a sliding seal between them. Attachment means as provided at both ends so the device can structurally be incorporated into a piping system. The union of this invention also provides these properties.

In the prior art devices, there has always been the nagging problem that shortening and lengthening the union are equally convenient, and that it was possible readily to separate the two tubes. Is is clearly preferably to facilitate the shortening of the device for installation purposes, but desirable to make it relatively more difficult to separate the tubes or to disassemble the tubes from each other, in order to make a better fluid sealing joint, and in order to keep the union in one piece during handling.

It is an object of this invention to provide a union which can readily be reduced in length, less readily be elongated, and less readily be disassembled, all compared to unions in which reduction or enlargement of length are equally conveniently attained, and in which the two tubes are readily separated.

BRIEF DESCRIPTION OF THE INVENTION

A piping union according to this invention has a first and a second telescoping tube. A first end of each tube is adapted for attachment to a next assembly in a piping system. The second end of each tube is a telescopic end, one fitting inside the other.

One of the tubes is an inside tube having an outer diameter. The other of the tubes is an outside tube having an inner diameter. The inner diameter of the outside tube has a basic sealing diameter, and a cylindrical ledge of lesser diameter which forms a retention shoulder, and constitutes an aligning means to hold the tubes in close axial alignment.

The inner tube also has a plurality of ring grooves, each groove having a pair of axially spaced apart shoulders and a groove bottom which is tapered, enlarging as it extends towards the first end of its tube. An O-ring is fitted in each of these grooves, so proportioned and arranged as readily to retract into the deeper part of its groove when the length of the union is shortened, and to raise into the shallower part of its groove when the length is increased to improve the sealing properties of the O-ring. The shoulder provided by the ledge increases resistance to separation of the tubes.

If desired, a snap ring and snap ring groove can be provided on the inner tube to react with the shoulder at the end of the ledge, further to resist separation of the tubes.

The above and other features of this invention will be fully understood from the following description and the accompanying drawings, in which:

BRIEF DESCRIPTION OF THE DRAWINGS

FIG. 1 is an axial cross-section showing the presently-preferred embodiment of the invention;

FIG. 2 is a cross-section taken at line 2—2 in FIG. 1; and

FIGS. 3 and 4 are fragmentary sections showing an operative feature of the invention.

DETAILED DESCRIPTION OF THE INVENTION

A piping union 10 according to this invention has an outer tube 11 and an inner tube 12. These tubes make a sliding telescopic fit with each other so as to be able to contract and enlarge the axial length 13 along central axis 14.

Attachment means 15 is provided at first end 16 of the outer tube. Basically, means 15 is a shoulder 17 adapted to be engaged by an overhanging shoulder 18 on a coupling nut 19, for example. A next assembly 20, perhaps the end of another tubing or the attachment stub of a valve (not shown) has an external thread 21 to be engaged by the coupling nut. A ring seal 22 is fitted between the next assembly and the end of the outer tube.

Attachment means 25 on the inner tube comprises an enlargement suitable for engagement by any desired mechanism. The attachment means shown are given as examples and not as limitations, to illustrate the fact that the two tubes are intended to be installed in a piping system by being structurally interconnected to a next assembly.

The outer tube has an inner cylindrical passage 30 with a basic sealing diameter 31 which extends away from its first end toward its second end 32. At its second end there is a frusto-conical lead-in ramp 33, leading to a cylindrical ledge 34 of lesser diameter 35 than sealing diameter 31. The ledge extends for a substantial distance to a shoulder 36, which extends to diameter 31. If desired, shoulder 36 can be undercut as shown, or may be planar or reversally sloped, as will later be discussed.

Inner tube 12 has a central passage 40 from its first end 41 to its second end 42. From its second end it is cylindrical with a diameter substantially equal to diameter 35, so as to make a close sliding fit which aids in supporting the tubes in concentric alignment.

A plurality of ring grooves 45,46 are formed in the outer wall of the inner tube. These are identical, and groove 45 is shown enlarged in FIGS. 3 and 4. Each has side walls 50,51, spaced apart by a bottom wall 52. Bottom wall 52 is tapered, and its taper enlarges as it extends towards the first end of the inner tube. Importantly, these grooves are wider than ordinarily provided for O-ring grooves. The purpose of the excess length 53 is to control the radial squeeze on the O-ring. FIG. 3 shows that O-ring 55 is shifted toward the deeper end of the O-ring when the inner tube is moved into the outer tube. This reduces the squeeze when the tubes are relatively moved in this direction, which makes it easier to reduce the total axial length than to increase it. FIG. 4 shows that separative movement shifts to O-ring to the shallow end of the ring groove, which importantly increases the retention force. It also importantly strengthens the seal against fluid pressure.

Further, this facilitates the deflection of the O-ring into the groove while it is passing through the ledge. When the tubes are reversally moved, shoulder 36 will resist passage of the O-rings, although separation can be accomplished, perhaps even by cutting the O-ring by the inner edge of the shoulder. This is especially the situation when shoulder 36 is undercut. Removal is easier if shoulder 36 is reversally tapered or planar.

The two O-rings are adequate to restrain the tubes against separation at very substantial pressures.

Should greater protection against separation be desired, a snap ring groove 60 of substantially the same configuration as groove 45 can be provided and a snap ring of less than 360 degrees circumference can be set in this groove. Then the snap ring can pass through the ledge and snap out as a more reliable retention. This is optional.

By providing O-ring grooves which are significantly wider than the O-ring to enable the O-ring to move from end to end of the groove, varying the squeeze as it does, there results a union which is simple to install, and whose pressure reliability actually increases with system pressure.

The invention is not to be limited by the embodiment shown in the drawings and described in the description, which is given by way of example and not of limitation, but only in accordance with the scope of the appended claims.

I claim:

1. A piping union having a central axis, and having a length adapted to be adjustably lengthened and shortened, said union comprising:

an inner tube having a first end, a second end, an axial flow passage from end to end, an axially-extending circularly cylindrical outer wall having a diameter, said first end being adapted for connection to a next assembly, said outer wall having, adjacent to its second end, a plurality of peripheral ring grooves, each said groove having a side wall, said side walls being axially spaced apart by a reference distance, and a bottom wall which is tapered and enlarges as it extends toward said first end;

an outer tube having a first end, a second end, and an axial flow passage from end to end having an axially extending circularly cylindrical inner wall portion having a diameter, said first end being adapted for connection to a next assembly;

an O-ring seated in each of said ring grooves, said O-rings in their unconfined condition having a radial thickness greater than the distance between the shallowest portion of the ring groove and the diameter of said inner wall portion of the outer tube, and at least as large as the distance between the deepest portion of the ring groove and the diameter of said inner wall portion of said outer tube;

said O-ring having an axial thickness less than the spacing apart of the sidewalls;

whereby said O-rings will always make a seal between said inner and outer tubes, and can shift axially in said ring grooves, making it easier to move the inner tube inwardly relative to the outer tube, than to move it outwardly relative to the outer tube;

said passage in said outer tube having adjacent to its first end a cylindrical ledge of lesser diameter than the diameter of its respective inner walls, and substantially equal to the outer diameter of the inner tube to stabilize the tubes concentrically, the volume of said ring grooves being sufficient to receive the deformed O-ring as it passes through said ledge.

2. A union according to claim 1 in which a shoulder is formed between said inner wall portion and said ledge to frustrate passage of said O-rings to the ledge thereby making separation of the tubes at least more difficult.

3. A union according to claim 2 in which said shoulder is undercut.

4. A union according to claim 2 in which a snap ring groove is formed peripherally around said outer wall of the inner tube, adjacent to said second end, and a snap ring is fitted into said snap ring groove, said snap ring being so proportioned and arranged as to be deflectable into the snap ring groove so as to pass through said ledge, and is springily formed so as to expand beyond said groove while still being retained therein, whereby to hold the inner tube against separation from the outer tube by virtue of engagement with said shoulder.

5. A union according to claim 1 in which the attachment means for the outer tube comprises an external shoulder and a coupling nut surrounding the outer tube and bearing against this shoulder, said coupling nut being internally threaded to engage a next assembly.

* * * * *